US008422191B2

(12) United States Patent
McEnhill et al.

(10) Patent No.: US 8,422,191 B2
(45) Date of Patent: Apr. 16, 2013

(54) CONTROLLED DISSIPATION OF ELECTROSTATIC CHARGE

(75) Inventors: Corey McEnhill, Dublin, OH (US); Nathaniel Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/766,485

(22) Filed: May 7, 2010

(65) Prior Publication Data

US 2011/0273814 A1 Nov. 10, 2011

(51) Int. Cl.
*H05F 3/00* (2006.01)
*B60C 19/08* (2006.01)

(52) U.S. Cl.
USPC .......................................... 361/216; 361/217

(58) Field of Classification Search ........... 361/216–217
See application file for complete search history.

(56) References Cited

U.S. PATENT DOCUMENTS

| | | | |
|---|---|---|---|
| 3,099,774 | A | 7/1963 | Crane |
| 5,073,425 | A | 12/1991 | Dees, Jr. |
| 5,213,865 | A | 5/1993 | Yamada |
| 5,761,022 | A | 6/1998 | Rankilor |
| 5,825,605 | A | 10/1998 | Sutherland |
| 6,459,560 | B1 | 10/2002 | Beribisky |
| 7,013,930 | B2 | 3/2006 | Mann |
| 7,715,169 | B2 | 5/2010 | Mathison et al. |

FOREIGN PATENT DOCUMENTS

| | | |
|---|---|---|
| DE | 19508521 A1 | 9/1996 |
| DE | 19745869 A1 | 5/1998 |
| JP | 01127433 A | 5/1989 |
| JP | 11297490 A | 10/1999 |

OTHER PUBLICATIONS

Ishii Naoto; Satic electricity removing structure for vehicle; Publication No. JP 01-127433; Abstract.*
"Understanding the Resistivity of Materials," Compliance Engineering at www.ce-mag.com, published online in Nov./Dec. 2000, ESD Association, Los Angeles, CA, USA.

* cited by examiner

*Primary Examiner* — Dharti Patel
(74) *Attorney, Agent, or Firm* — Capitol City TechLaw PLLC; Mark E. Duell

(57) ABSTRACT

Disclosed is an improved ESD control system for use in vehicular applications that incorporated one or more dissipative elements constructed from a blend of polypropylene and a urethane/acrylic alloy which form substantially co-continuous networks and which are suitable for injection molding operations to produce dissipative elements. The dissipative elements are then incorporated into vehicular interiors in a manner whereby a surface of the element is exposed to contact, whether incidental or deliberate, by the vehicle occupants, particularly as they are entering or exiting the vehicle, to provide controlled dissipation of electrostatic charges that have accumulated on the occupants. In particular, these materials may be used in forming portions of the vehicle seat assembly and/or door assembly that will typically be contacted during egress, operation of the vehicle and/or ingress in order to suppress subsequent and less controlled discharges that could compromise the comfort and safety of the vehicle occupants.

20 Claims, 8 Drawing Sheets

FIG. 4A
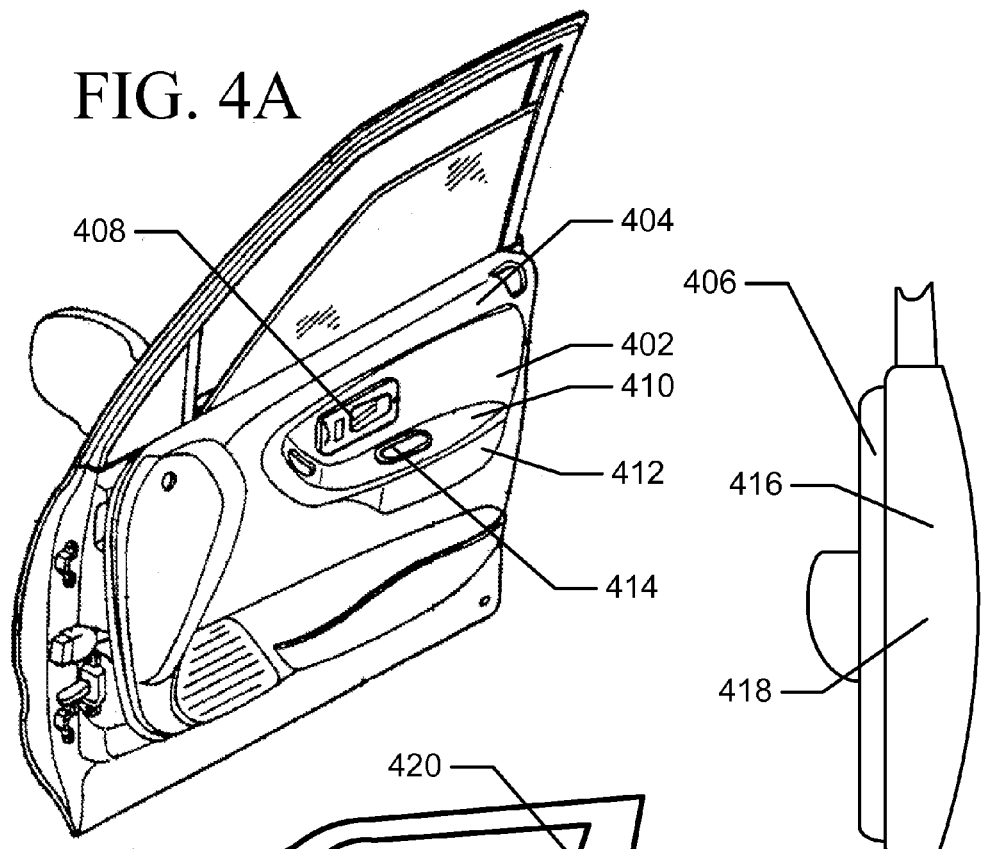
FIG. 4C
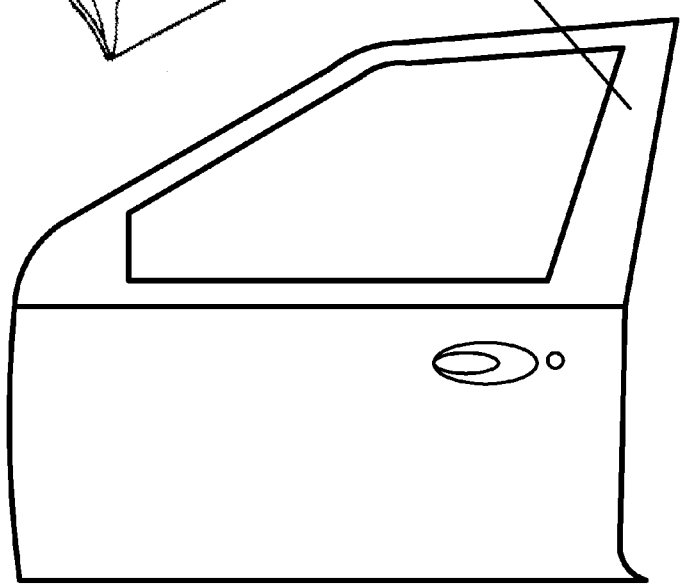
FIG. 4B

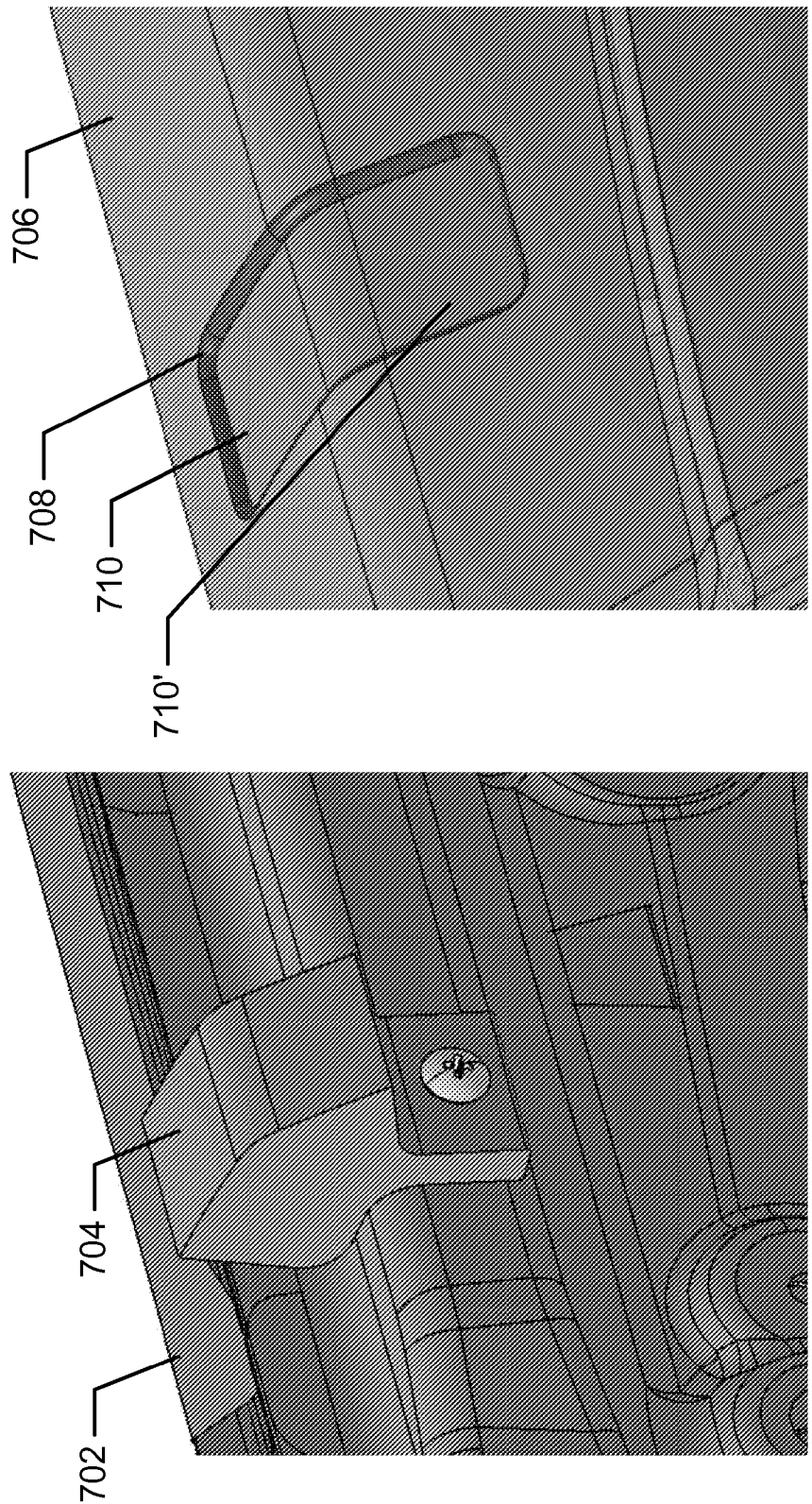

CONTROLLED DISSIPATION OF ELECTROSTATIC CHARGE

TECHNICAL FIELD

This invention relates to materials, apparatus and systems for controlling and managing electrostatic discharge (ESD) in and around motor vehicles to improve the comfort and safety of the vehicle operators, passengers and others in the general vicinity. As detailed below, the selection and location of materials throughout a motor vehicle may be used to define and control the initial accumulation of static charge, the available discharge path(s) and the characteristics of the discharge pulse to reduce or eliminate the pain and ignition risk associated with rapid discharges.

BACKGROUND OF THE INVENTION

A range of materials are used in manufacturing vehicle interiors, including components such as the upholstery and trim, while a different range of materials may be found in the clothing worn by the vehicle occupants. Depending on the composition(s) and manner in which a particular combination of materials come into contact with one another, a significant static charge may accumulate on the vehicle occupant. A rapid discharge of this accumulated charge is, at best, unpleasant and, in some instances, truly dangerous and should be reduced or avoided if possible. Vehicle occupants have complained, for example, of receiving shocks associated with rapid electrostatic discharge after coming into contact with inner door handles, seat beat anchors and glove box latches.

It does not appear that these ESD issues are unique to a particular manufacturer, market segment or region, but the number and severity of ESD issues does tend to vary somewhat with vehicle design, the occupant's actions and various environmental factors, particularly humidity. There is also a small but recognized risk of accidental fires at fueling stations resulting from an electrostatic discharge initiated by the person performing the fueling operation either as the result of an accumulated charge on their person or through contact with another charged object, e.g., a plastic fuel container.

A number of devices have been provided for safely dissipating static electricity in the vicinity of fuel pumps including, for example, fuel nozzle lockouts that are released only after a grounding device has been engaged and ESD grounding pads provided on the fuel pump assemblies at location remote from the fueling operation. Similarly, a number of procedures have been recommended for safely dissipating static electricity in the vicinity of fuel pumps including, for example, placing fuel containers on the ground and maintaining contact between the nozzle and container during the fueling operation to eliminate an air gap through which a spark could jump.

BRIEF SUMMARY OF THE INVENTION

As detailed below, improved control of ESD in automotive applications has been achieved by blending a base polypropylene composition with a urethane/acrylic alloy to produce dissipative polymers suitable for manufacturing a variety of injected molded components and fibers that may be incorporated into automotive interiors. The use of these materials in an ESD suppression system that can be incorporated into automotive interiors provides for continuous and/or periodic dissipation of electrostatic charges that have accumulated on the vehicle occupants. In particular, these materials may be used in forming portions of the vehicle seat assembly and/or door assembly that will typically be contacted during egress, operation and/or ingress, in order to suppress subsequent and less controlled discharges that could compromise the comfort and safety of the vehicle occupants and others in the general vicinity.

As detailed below, the disclosed compositions are formulated and configured to provide a combination of ESD protection and physical properties sufficient to meet manufacturing, resistance, durability and aesthetic goals. In particular, the disclosed compositions typically exhibit surface resistivity of about $5.0 \times 10^9 \Omega$, a flexural modulus of at least 2156 MPa, a heat deflection temperature of at least 80° C. at 0.45 MPa, and Izod impact of at least 49 J/m. In addition to the material mechanical properties, the dissipative elements formed from the disclosed compositions which incorporate a polymer alloy (urethane and acrylic) with a base polymer (polypropylene) may be configured to provide controlled discharge times of between about 400 ms and 1 second for static charges on the order of 10 kV charge in order to suppress spark discharge.

It is an object of the invention to provide controlled static discharge paths on a vehicle that will retard the accumulation and/or facilitate the safe discharge of personal static electricity, particular as the driver and/or passenger exits the vehicle.

It is another object of the invention to reduce the fire hazard associated with fueling a passenger vehicle by providing contact surfaces within the vehicle by which occupants will achieve incidental and/or deliberate discharge of accumulated static charge to suppress the uncontrolled ESD and the associated pain and danger.

BRIEF DESCRIPTION OF THE DRAWINGS

Example embodiments described below will be more clearly understood when the detailed description is considered in conjunction with the accompanying drawings, in which:

FIGS. 4A-4C are illustrations of embodiments of the disclosed vehicular electrostatic discharge control system implemented in a door assembly;

FIGS. 7A and 7B are more detailed illustrations of an embodiment of the disclosed vehicular electrostatic discharge control system implemented in a door assembly;

Figure 1:
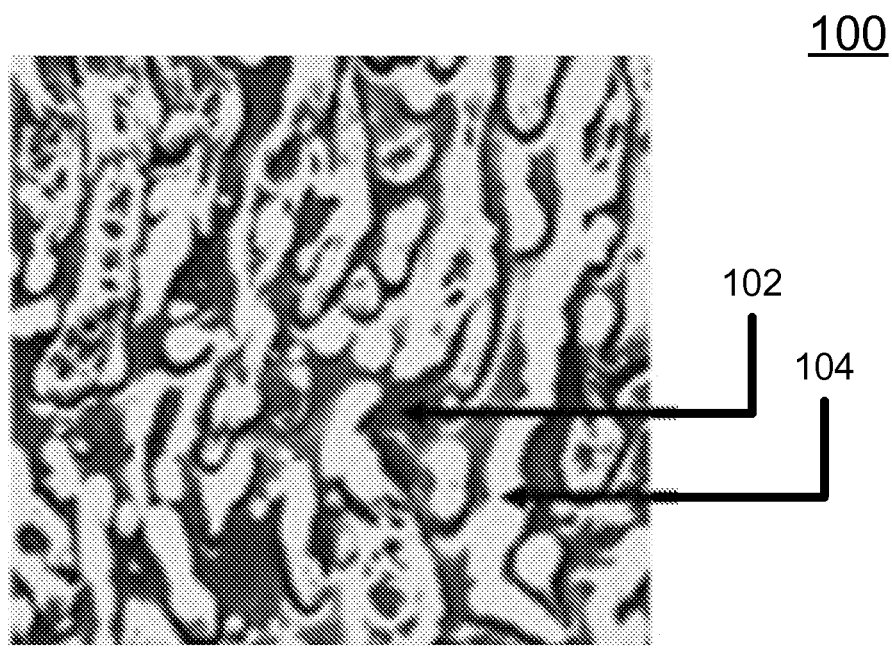
FIG. 1 is a SEM image illustrating in which a urethane/acrylic alloy is interspersed within a polypropylene host polymer to form substantially co-continuous morphologic networks throughout the dissipative polymeric material.

It should be noted that these Figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and, accordingly, should not be interpreted as defining or limiting the range of values or properties encompassed by example embodiments.

DETAILED DESCRIPTION

The triboelectric effect (also known as triboelectric charging) is a type of contact electrification in which certain materials can become electrically charged when they come into contact with another material and are then separated (such as through rubbing or sliding). The polarity and strength of the charges produced differ according to the materials, surface roughness, temperature, strain, and other properties.

Given the number of factors that determine the nature of triboelectric charging from the interaction of particular materials, the results for any particular combination and contact scenario are not readily predicted, so only broad generalizations can be made with reasonable confidence. Introductory physics classes have long demonstrated this property by, for example, rubbing an amber rod with a dissimilar material such as wool. Other examples of materials that can acquire a significant charge when rubbed together include glass rods rubbed with silk or hard rubber rods rubbed with fur.

Triboelectric charts often list or rank materials in order of the polarity of charge separation when they are touched with another object. Materials toward the bottom of the series, when touched to a material near the top of the series, will typically attain a more negative charge, and vice versa. The more dissimilar the materials are in terms of their triboelectric properties, the greater the charge that will be transferred during a given contact. Conversely, materials having similar triboelectric properties may not exchange any charge, may exchange only a minor charge, the polarity of which may be the opposite of that which would be implied by their relative rankings. The interaction of similarly responsive materials may depend more on the nature and duration of the contact, the presence of contaminants or oxides, or upon environmental properties other than on the type of material(s). Lists vary somewhat as to the exact order of some materials, because the charge also varies for nearby materials.

Although triboelectric is derived from the Greek for "rubbing," tribos, the two materials only need to come into contact and then separate for electrons to be exchanged, leaving one material with a net positive charge and the other material with a net negative charge. After coming into contact, a chemical bond is formed between some parts of the two surfaces, called adhesion, and charges move from one material to the other to equalize their electrochemical potential. This movement of charges creates the net charge imbalance between the objects. When separated, some of the bonded atoms have a tendency to retain extra electrons, and some have a tendency to give extra electrons away. The ingress and egress of vehicle occupants, and the associated movement of clothing against and across upholstery, may be a significant source of static charge given that skin, leather, nylon and wool are generally positive charge materials while polyester, polypropylene and vinyl are generally negative charge materials. Collected complaint data indicates that vehicles having fabric upholstery are more prone to ESD issues than those incorporating a combination of leather and fabric, leather or synthetic leather.

The triboelectric effect is related to friction only because they both involve adhesion. However, the effect is greatly enhanced by rubbing the materials together, as they touch and separate many times on the microscopic scale. For surfaces with differing geometry, rubbing may also lead to heating of protrusions, causing pyroelectric charge separation which may add to the existing contact electrification, or which may oppose the existing polarity.

Because the surface of the material is now electrically charged, either negatively or positively, any contact with an uncharged (or grounded) conductor or an object having a substantially opposite charge profile will tend to discharge the built-up static electricity and, in instances of sufficient potential, will produce a noticeable spark. A person simply walking across a carpet may build up a charge of many thousands (kV) of volts, enough to cause a spark to jump an air gap of as much as one centimeter or more. Low relative humidity in the ambient air increases the voltage at which electrical discharge occurs across a given distance by increasing the ability of the accumulating material to hold charge and, by decreasing the conductivity of the air, making it difficult for the charge build-up to dissipate gradually. Indeed, under sufficiently dry conditions, simply removing a synthetic blend shirt can create numerous sparks that are easily visible in a darkened room. Vehicle travel can also induce charge collection on the metal vehicle body (which acts as a Faraday cage insulated from the ground by the tires) and its occupants. This charge can be dissipated as an occupant exits the vehicle and provides a path to ground or when an occupant comes into contact with a grounded conductor, e.g., vehicle frame elements.

This type of discharge is often essentially harmless because the energy E released by the discharge ($\frac{1}{2}V^2 \cdot C$ where V is the voltage and C is the capacitance) is relatively small, but can total several or even tens of joules or more in dry weather (low relative humidity (R.H.), and typically much less under humid conditions (high R.H.). Discharges in this energy range, while they can be unpleasant, do not tend to cause permanent injury and, if they occur as the occupant exits the vehicle, tend to occur at a point sufficiently removed from flammable gas mixtures so as not to spark fires. Similar sparks can, however, can ignite more volatile gas mixtures including, for example, methane-air, hydrogen-air and gasoline-air mixtures and do, therefore, remain a concern during fueling. Indeed, at less than 10% R.H. it is believed that discharges of as little as 0.2 mJ may be sufficient to ignite a range of air/fuel vapor concentrations, particularly those at or near their flash point under normal ambient conditions.

As reflected in the literature, a number of techniques have been applied to reduce the risks associated with ESD in and around vehicles. It has been found that a contact region provided on a surface that will be contacted during normal egress from a vehicle that provides a current path exhibiting a resistivity of about 100 MΩ achieves a discharge profile sufficient to dissipate a 10 kV charge without spark or discomfort. Research has indicated that a 10 kV charge discharging over a period, Δt, of less than about 200 ms resulted in pain and frequently spark generation. Discharging the same charge over a period between about 200 ms and 400 ms was still perceived as unpleasant by a number of test subjects while periods greater than about 400 ms were generally not perceptible to the test subjects.

As will be appreciated, ensuring a sufficient period of contact between a vehicle occupant and a dissipation surface to achieve a controlled discharge can be difficult. Experiments were conducted in which subjects were requested to touch a first discharge surface of a period of 2 seconds and a second discharge surface for an "appropriate" period of time.

In response to the first instruction, the test subjects maintained contact with the discharge surface for an average of about 1.4 seconds while in response to the second instruction the test subjects maintained contact with the discharge surface for an average of only about 0.7 seconds. Accordingly, in lieu of specific instructions, it was determined that the discharge system should achieve the target dissipation within a period of about 0.4, to eliminate discharge sensation, to 1 second, to achieve a sufficiently rapid discharge within a reasonable period of time.

Discharge profiles can be modeled using a Human Body Model (HBM) in which the vehicle "occupant" was assigned a capacitance of 100-200 pF (although the contribution of clothing can markedly affect the capacitance, particularly depending on the adjacent materials). Using this HBM, an occupant having a 4 kV charge in a relatively dry environment (10% R.H.) can produce a maximum discharge current of about 14 A and a total energy dissipation of about 2.7 joules over a period of about 0.1 ms. Similarly, an occupant carrying a 25 kV charge could produce a total energy dissipation of on the order of 50 joules. Given that certain air-fuel mixtures can be ignited by discharges on the order of 0.2 mJ, it is clear that efforts to reduce the occupant's static charge prior to fueling should be pursued.

Various material compositions were evaluated to determine an appropriate resistance range for achieving a substantially complete discharging of a 10 kV charge with a contact duration of 1 second. The material under test (MUT) was applied as a high resistance coating to a conductive material with the combination being connected to ground voltage. The results of this evaluation are reflected in Table 1.

TABLE 1

| Resistance (MΩ) | Result |
| --- | --- |
| 5 | spark discharge generated |
| 10 | spark discharge generated |
| 400 | discharge within 1 second |
| 1,500 | — |
| 10,000 | discharge required 3 seconds |
| 300,000 | discharge required >5 seconds |

In order to obtain the desired combination of properties suitable for manufacturability, durability and finish appearance, a variety of polymer blends were evaluated. Polymers selected for the evaluation included polycarbonate (PC), polyethylene terephthalate (PET) and polypropylene (PP) in combination with an inherently dissipative polymer (IDP). A summary of the preliminary results is provided below in Table 2.

Based on this evaluation, the polymer composition with the polypropylene base, PP+IDP, was selected for additional evaluation. The polypropylene, which exhibits a relatively high resistance (on the order of $4.4 \times 10^8$ MΩ), in combination with a more conductive urethane/acrylic alloy, exhibiting a much lower resistance (on the order of 0.5 MΩ), provided a generally suitable combination of properties. The urethane portion of the IDP may, for example, comprise an aliphatic urethane with a polyether polyol that exhibits a Shore Hardness of at least 75 A. Other additives and components including, for example, carbon black and/or carbon nanotubes, could be added to further modify the properties of the basic polypropylene-urethane/acrylic composition. The surface morphology achieved with the basic polymeric combination is reflected in the SEM image (7500× magnification) of a sample 100 reproduced in FIG. 1 in which the urethane/acrylic alloy 102 is interspersed within the polypropylene host polymer 104 to form substantially co-continuous morphologic networks throughout the material.

Based on the initial results, additional compositions were prepared by modifying the ratio of the components in the preferred polypropylene-urethane/acrylic composition. As reflected in the data provided below in Table 3, Tests 1 and 2 exhibited unsatisfactory performance with respect to flex modulus, specific gravity and defection temperature under load (DTUL or HDT). These deficiencies were addressed by increasing the overall stiffness through the addition of more glass fiber with a nominal glass content of about 36% producing satisfactory results. Test 3, while reflecting some improvement over Tests 1 and 2, exhibited unsatisfactory post-aging performance. Aging testing included xenon light-aging (125 MJ), heat-aging (500 and 1000 hr), humidity-aging (500 and 1000 hr) and thermocycling (5 cycles), after which the discharge performance of the aged parts was tested for degradation. Test 4 was compounded with an altered polypropylene/urethane-acrylic alloy ratio and represented a successful attempt to improve post-aging performance with the discharge time exhibiting little or no aging-related deterioration. Although the composition of Test 4 exhibited improved performance in some aspects, the elongation, specific gravity and HDT requirements were still outside the target range. As will be appreciated by those skilled in the art, however, parts manufactured using the preferred composition could be modified in various ways to compensate for any minor deficiencies in certain parameters, e.g., sized up to compensate for lower bulk strength.

TABLE 2

| Property (units) | ASTM Std | PC + IDP | PET + IDP | PP + IDP |
| --- | --- | --- | --- | --- |
| Flex Modulus (MPa) | D790 | 1869 | 4517 | 2138 |
| Notched IZOD impact (J/m) | D256 | 626 | 95 | 79 |
| Specific Gravity | D792 | 1.20 | 1.15 | 1.24 |
| HDT @ 66 psi (° C.) | D648 | 120 | 164 | 84 |
| Surface Resistivity (Ω/sq) | D257 | 2.10E+10 | 8.20E+09 | 1.4E+09 |
| Initial Discharge Time (s) | — | 1.3 | 1.2 | 0.9 |

TABLE 3

| Property (units) | ASTM Std | Test 1 | Test 2 | Test 3 | Test 4 |
|---|---|---|---|---|---|
| Tensile Strength @ yield (MPa) | D638 | — | — | — | 34.47 |
| Tensile Elongation @ yield (%) | D638 | — | — | — | 4 |
| Flex Modulus (MPa) | D790 | 2138 | 1131 | 4137 | 3612 |
| Notched IZOD impact (J/m) | D256 | 79 | 124 | 79 | 82 |
| Specific Gravity | D792 | 1.22 | 1.20 | 1.27 | 1.24 |
| HDT @ 66 psi (° C.) | D648 | 84 | 120 | 124 | 110 |
| Initial Discharge Time (ms) | — | 420 | 470 | 500 | 440 |
| Aged Discharge Time (ms) | — | — | — | 400 | 413 |
| Surface Resistivity (Ω/sq) | D257 | 1.4E+09 | 4.90E+08 | 5.10E+09 | 5.0E+09 |

Once a suitable material composition had been identified, it was necessary to integrate the material into a passenger vehicle in a manner that increases the likelihood that the material will provide a means for the controlled discharge of static charges associated with an occupant of the vehicle. Components manufactured from or incorporating the polypropylene/urethane-acrylic alloy composition (PP/U-A) may be utilized in a number of configurations including, for example, an exposed surface provided on the vehicular seating assembly, incorporated into the seating surfaces or the seating material, configured as a thread for stitching upholstery with an exposed thread and/or provided as a touch pad or other surface on the door assembly or dashboard assembly. As will be appreciated, each of these applications has its own advantages and disadvantages.

With respect to incorporating the dissipative polymeric material into thread, for example, durability and the ability to alter the color of the thread using a dye or other coloring process would need to be addressed before such a solution was realistically incorporated into vehicle seating. Providing the material on other surfaces of a seat assembly would present additional concerns, particularly with regard to the general accessibility of the contact surface during normal vehicle operation and the variability of the resulting ESD performance experienced by the affected occupants.

Figure 2:
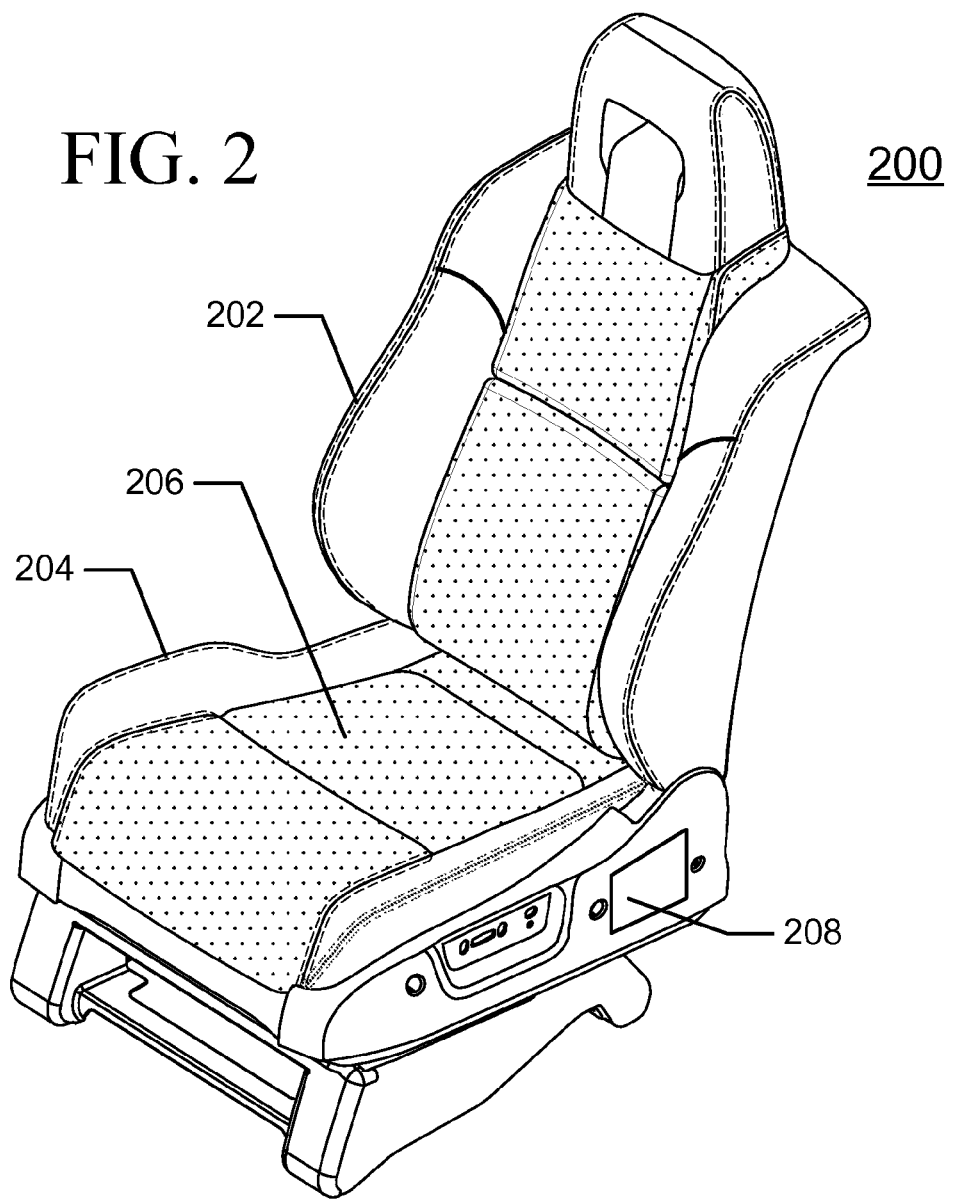
FIG. 2 is an illustration of an embodiment of the disclosed vehicular electrostatic discharge control system implemented in a seating assembly.
Figure 3:
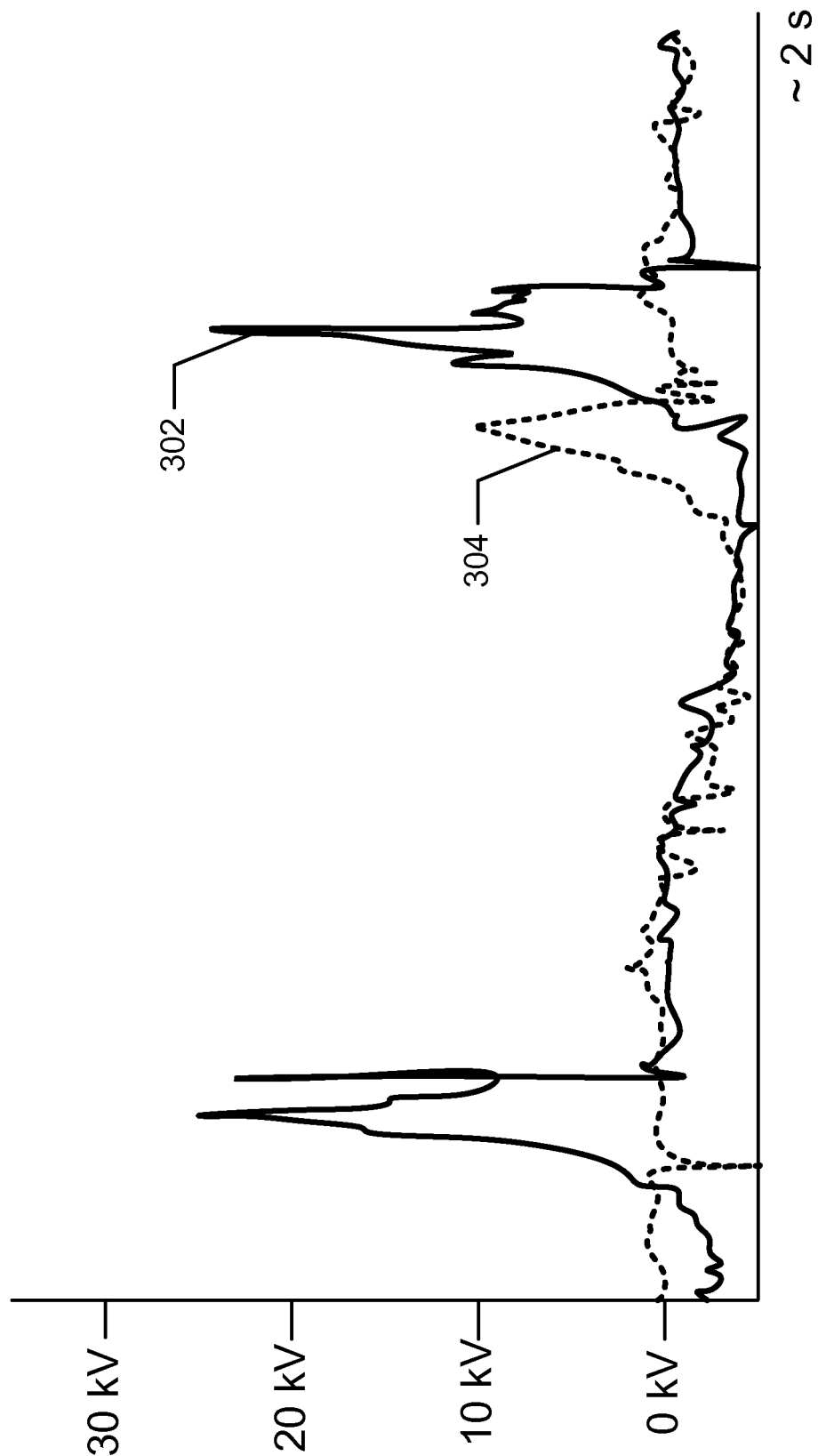
FIG. 3 illustrates an evaluation of the performance of a conventional seat as compared with the performance of a seat modified to incorporate the dissipative polymeric material as illustrated in FIG. 2.

In order to validate the concept, the performance of conventional seating 200 was compared with seating in which the upper and lower bolster regions 202, 204 were sewn with thread incorporating the dissipative polymeric material to produce exposed stitch lines as illustrated in FIG. 2. As also illustrated in FIG. 2, dissipative materials may be incorporated in the primary seating surface 206 and/or provided on a non-seating area of the seat assembly 208. As reflected in the data presented in FIG. 3, the conventional seat (solid line 302) exposed the occupant to static charges approaching 25 kV while the seat modified to incorporate the dissipative polymeric material (dashed line 304) exposed the occupant to static charges of only about 10 kV. Accordingly, incorporating dissipative materials into the seating surfaces can significantly reduce the overall static charge on the occupants as a part of an ESD reduction system and thereby improve the overall ESD performance of the vehicle.

As illustrated in FIGS. 4A-4C, dissipative contact areas can be provided on various regions of a vehicle door including, for example, the interior face of the door lining 402 above the armrest, the upper sill portion of the door lining 404, for example, adjacent a lock mechanism, the rear vertical surface of the door lining 406, adjacent the inner door handle 408, the vertical surfaces of the door assembly 416, 418, the upper surface of the armrest 410, the vertical face of the armrest 412, the exposed surfaces of the recess in the armrest 414 and/or the trim or garnish 420 provided on an exterior portion of the door assembly. As will be appreciated, certain of these locations are more likely to be contacted during the normal and expected operation of the door, particularly during egress, e.g., the inner door handle 408, while others, e.g., designated portions of the rear vertical surfaces of the door assembly, are much less likely to be touched routinely by a majority of the vehicle occupants.

Other considerations relating to the placement of the dissipation contact regions include, for example, visibility during operation of the vehicle and/or during ingress and egress, the surface appearance of the contact regions relative to the surrounding materials and surfaces, the likelihood of the designated contact surface(s) becoming soiled to an extent that the dissipative performance degrades and/or contact would tend to be avoided by most occupants, exposure of the contact region to environmental aging through light, temperature and/or humidity. Utilizing external trim components, for example, would significantly increase the contact surface's exposure to environmental factors and the associated durability concerns. Manufacturability will also be a concern with respect to the cost of the part(s) and additional labor, particularly to the extent that an additional electrical connection is required between the dissipative element and the vehicle chassis or electrical system to provide the necessary path to ground and/or any effect on the overall strength of the completed assembly that incorporates the dissipative element.

Figure 6:
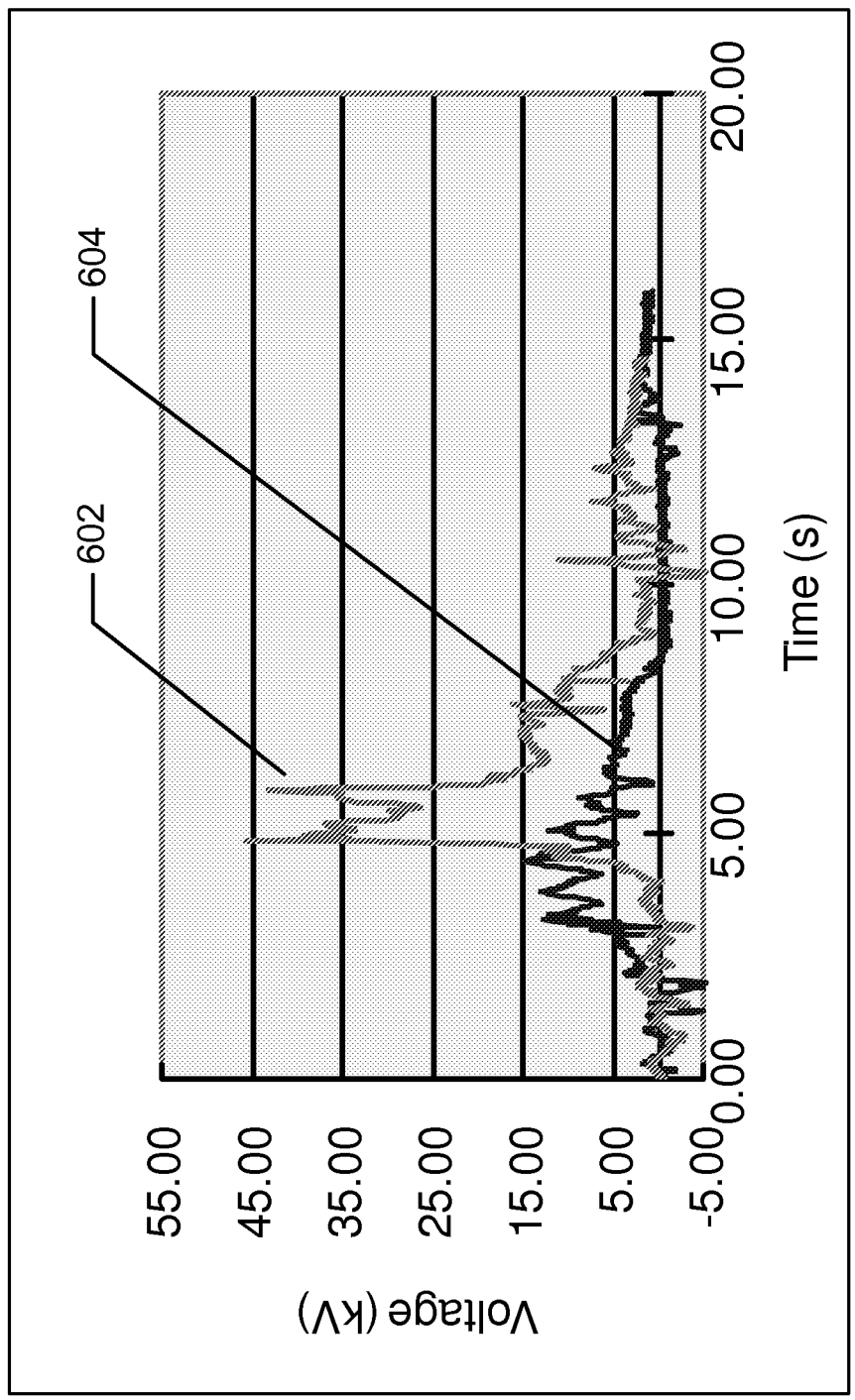
FIG. 6 further illustrates an evaluation of the performance of a conventional seat as compared with the performance of a seat modified to incorporate the dissipative polymeric material as illustrated in FIG. 2.

As reflected in the data presented in FIG. 6, the conventional seat (line 602) exposed the occupant to static charges of over 40 kV while the seat modified to incorporate the dissipative polymeric material (line 604) exposed the occupant to static charges of less than about 15 kV, even under extremely dry conditions (20° C., 2% R.H.). Accordingly, incorporating dissipative materials into the seating surfaces can significantly reduce the overall static charge on the occupants as a part of an ESD reduction system and thereby improve the overall ESD performance of the vehicle.

As will be appreciated, incorporating a vehicular electrostatic discharge control system utilizing elements to suppress the accumulation of a static charge on the vehicle occupants in combination with other elements arranged for removing at least the majority of the accumulated charge upon exiting the vehicle will provide increased protection relative to either element functioning in isolation. Similarly, incorporating dissipative elements that are likely or certain to be contacted upon exiting the vehicle will tend to improve performance relative to systems that rely on the vehicle's occupant to touch a discharge surface deliberately and for a sufficient period upon exiting the vehicle. This is particularly relevant because, as illustrated in FIG. 5B, it is the act of exiting, and the resultant friction between clothing and/or skin and the seating surfaces that tends to generate the static charge that the system is intended to dissipate.

An example embodiment of the incorporation of a dissipative element according to the disclosure in a vehicle is illustrated in FIGS. 7A and 7B. As illustrated, the dissipative element is manufactured from a composition including polypropylene and urethane-acrylic alloy, the composition and the dimensions of the part 704 being adjusted to provide the necessary mechanical strength and conductivity. The part is configured for direct attachment to the door stamping 702, thereby avoiding the need for additional parts and labor. One the dissipative part is in place the door liner 706 can be attached to the door stamping.

The door liner is provided with an opening 708 through which a contact surface 710 of the dissipative part 704 is exposed. This opening may be arranged adjacent to or even surrounding a lock mechanism (not shown) provided on the sill portion of the door liner. Alternatively, a contact surface may be incorporated as part of the inner handle mechanism (not shown) or may be provided on another portion of the door assembly where incidental contact with the vehicle occupant is expected, particularly during vehicle egress. Depending on the location of the contact region 710, the occupants may also be provided with instructions, signage or other indicia regarding the use and function of the contact region in suppressing uncontrolled ESD.

As also illustrated in FIGS. 7A and 7B, the contact region need not be planar and/or continuous (not shown), but can be arranged so that one or more exposed substantially planar portions 710, 710' define an offset angle $\theta$ that will typically between about 30° and 90°. As will be appreciated, the profile of the exposed region can be modified as necessary to cooperate with the door liner to provide an aesthetically and tactilely pleasing arrangement of color, texture and elevation. Indeed, although as illustrated the exposed portion 710 is recessed relative to the surface of the door liner 706, the dissipative part 704 may extend above the door liner (not shown) and provide an additional alignment guide for installing the door liner and/or provide a raised surface pattern repeating other interior or exterior design cues. Further, although illustrated as a single unitary element, the dissipative part 704 may be manufactured in multiple parts (not shown) to ease assembly or provide more complex visual impression as desired by the vehicle designer.

Figure 5A:
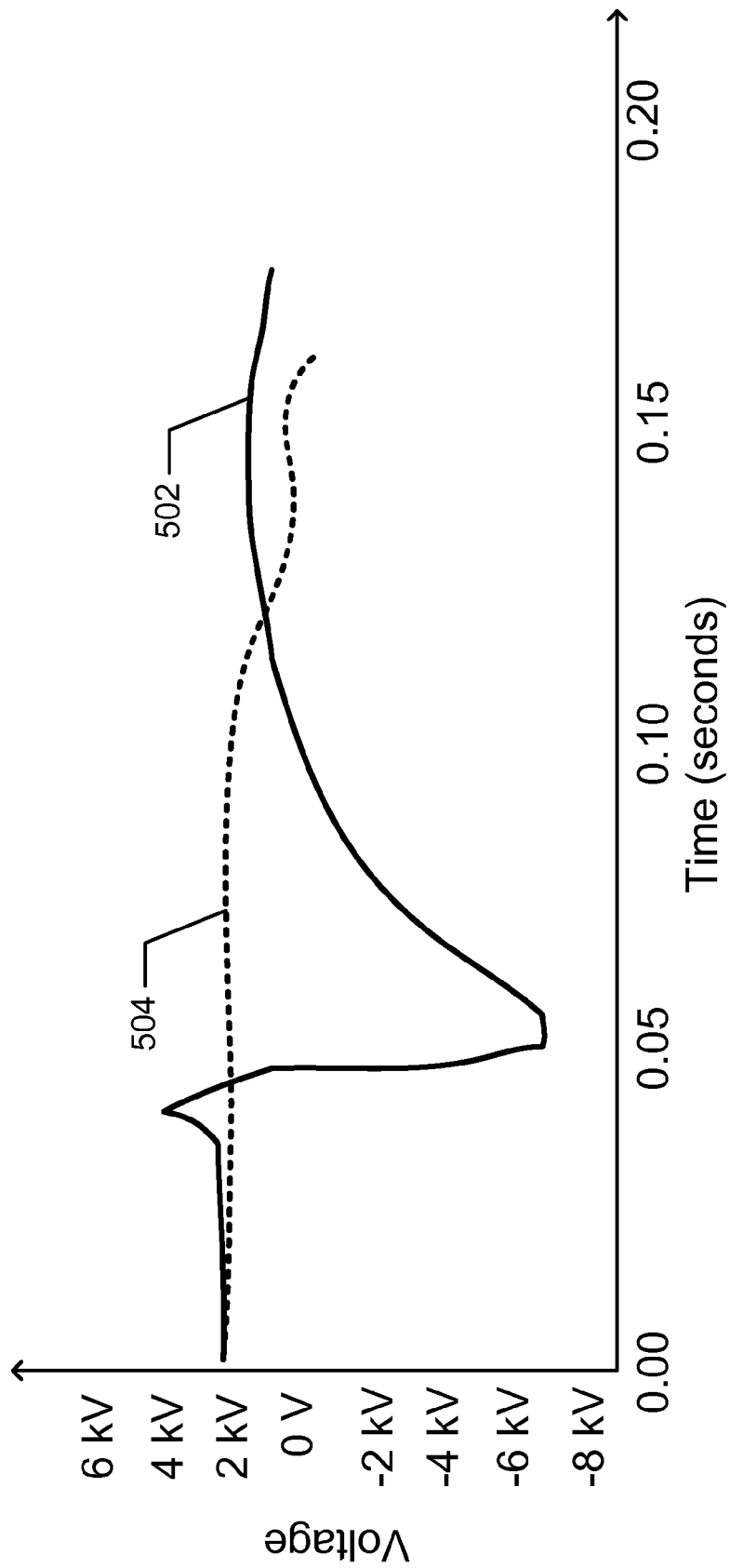
FIG. 5A illustrates an evaluation of the performance of a conventional spark discharge into a door assembly frame seat as compared with the performance of discharge through a door assembly modified to incorporate the dissipative polymeric material as illustrated in FIGS. 4A-4C.
Figure 5B:
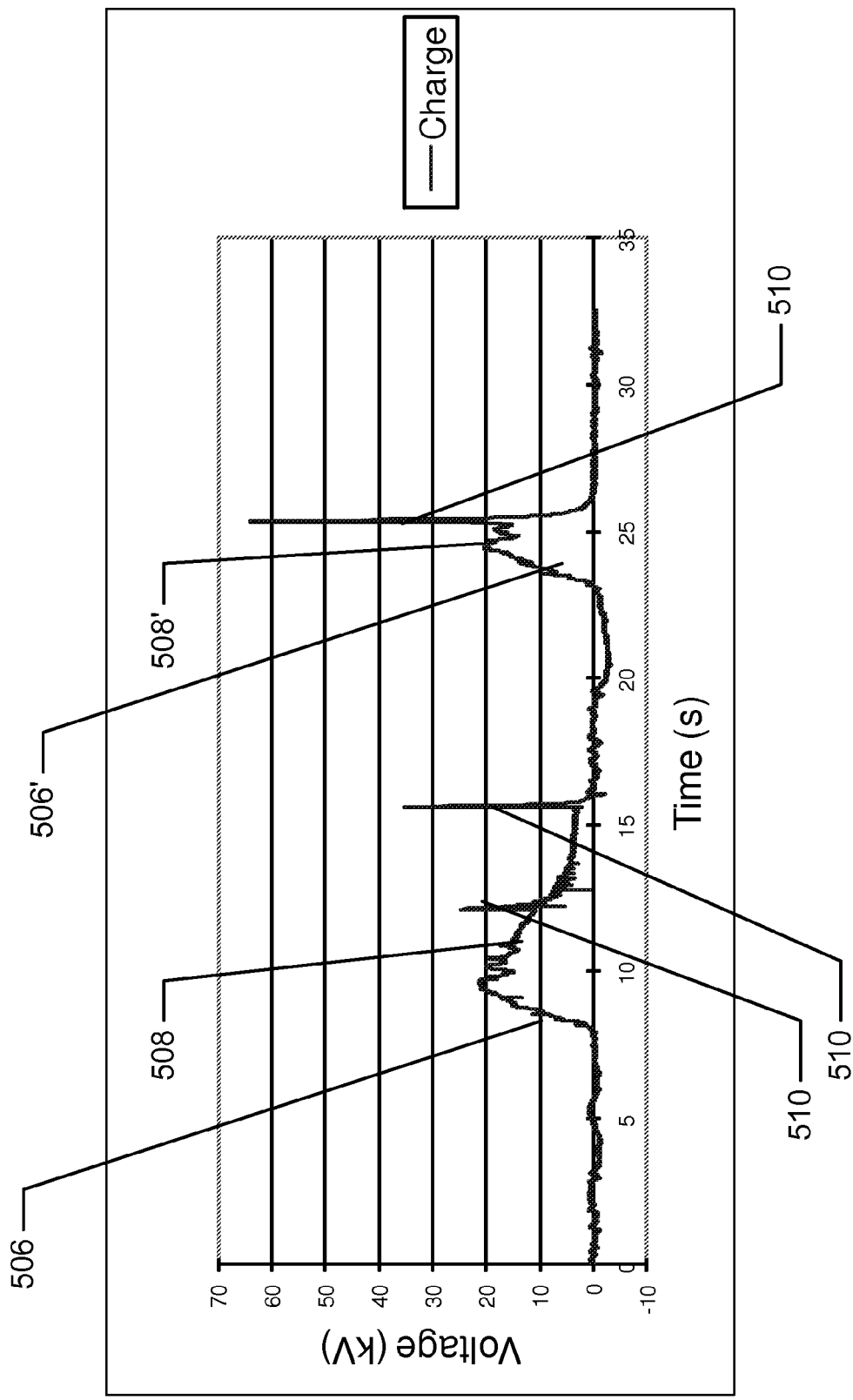
FIG. 5B illustrates the static charge developed by a vehicle occupant entering and exiting a conventional vehicle.

As illustrated in FIG. 5A, the discharge profiles 502, 504 reflecting a nominal 2 kV discharge directly to a door frame occurs within about 5 ms, while a corresponding discharge through a contact region incorporating the dissipative polymeric material 504 is much more controlled, occurring over a period of about 60 ms and without incurring the substantial negative voltage spike, shock to the passenger, reflected in the uncontrolled data. The instantaneous charge on a vehicle occupant can vary widely depending on the nature of the vehicle's seating and flooring surfaces as well as the occupant's clothing and movements. In order to examine a representative charging profile, a test subject twice entered and exited a vehicle equipped with leather seats while the accumulated charge was monitored. As reflected in FIG. 5B, there was a rapid accumulation of charge to about 20 kV both times the test subject initiated the movements associated with exiting the vehicle 506, 506' and the voltage began to decrease as the test subject closed the door 508, 508' while the test subject experienced three spark discharges 510 over the course of the less than 30 second test procedure.

One skilled in the art will appreciate various modifications can be made to the teachings of the present disclosure without departing from the intended spirit and scope thereof. It is intended that the inventions disclosed herein be limited only by the terms of the appended claims.

We claim:

1. A vehicular electrostatic discharge control system comprising:
   a dissipative element comprising a composition comprising polypropylene and a urethane/acrylic alloy, wherein the dissipative element includes a contact surface; and
   a vehicle chassis, wherein the dissipative element is connected to the vehicle chassis in a manner that defines an electrical connection from the contact surface to the chassis through which a 10 kV charge can be dissipated during a discharge period of from 400 ms to 1000 ms.

2. The vehicular electrostatic discharge control system according to claim 1, wherein:
   the electrical connection exhibits a resistance of 100 M$\Omega$ to 400 M$\Omega$.

3. The vehicular electrostatic discharge control system according to claim 1, wherein:
   the combination of polypropylene and urethane/acrylic alloy form substantially co-continuous networks throughout the dissipative element.

4. The vehicular electrostatic discharge control system according to claim 1, wherein:
   which a 25 kV charge can be dissipated during a discharge period from 400 ms to 1000 ms.

5. The vehicular electrostatic discharge control system according to claim 1, wherein:
   the contact surface comprises a plurality of thread sections exposed on a seat assembly surface.

6. The vehicular electrostatic discharge control system according to claim 5, wherein:
   the plurality of thread sections comprise a portion of a seating surface, the seating surface comprising a fabric selected from the group consisting of woven fabrics, non-woven fabrics and multi-layer fabrics.

7. The vehicular electrostatic discharge control system according to claim 1, further comprising:
   a second conductive element formed from a second combination of polypropylene and urethane/acrylic alloy, wherein the second conductive element includes a second contact surface, wherein the second conductive element is connected to the vehicle chassis in a manner that defines a second conductive path between the second contact surface and the chassis through which a charge of at least 10 kV can be dissipated during a discharge period of from 400 ms to 1000 ms.

8. The vehicular electrostatic discharge control system according to claim 7, wherein:
   the first and second combinations of polypropylene and urethane/acrylic alloy have substantially identical compositions.

9. The vehicular electrostatic discharge control system according to claim 7, wherein:
   the first contact surface comprises thread exposed on a seat assembly surface; and
   the second contact surface comprises an exposed portion of the second dissipative element, the exposed portion measuring at least 1 cm$^2$.

10. The vehicular electrostatic discharge control system according to claim 9, wherein:
    the second contact surface is provided on a door assembly.

11. The vehicular electrostatic discharge control system according to claim 1, wherein:
    the combination of polypropylene and urethane/acrylic alloy further comprises at least one component selected from the group consisting of glass fiber, carbon black, carbon nanotubes, UV stabilizers, cross-linking agents, viscosity modifiers, pigments, stabilizers, lubricants, release agents and fillers.

12. The vehicular electrostatic discharge control system according to claim 1, wherein:
the contact surface comprises an exposed portion of the dissipative element, the exposed portion measuring at least 1 cm$^2$.

13. The vehicular electrostatic discharge control system according to claim 12, wherein:
the contact surface comprises first and second exposed portions of the dissipative element, the first and second exposed portions defining an offset angle θ of between 30° and 90°.

14. The vehicular electrostatic discharge control system according to claim 1, wherein:
the contact surface comprises a plurality of exposed portions of the dissipative element, the total area of exposed portions measuring at least 1 cm$^2$.

15. The vehicular electrostatic discharge control system according to claim 14, wherein:
the contact surface comprises a plurality of thread sections exposed on a seat assembly surface.

16. The vehicular electrostatic discharge control system according to claim 15, wherein:
the plurality of thread sections are exposed on bolster regions of the seat assembly surface.

17. The vehicular electrostatic discharge control system according to claim 14, wherein:
the contact surface comprises an array of dissipative surfaces exposed or a primary seating surface.

18. The vehicular electrostatic discharge control system according to claim 17, wherein:
the array of dissipative surfaces protrudes above an upper surface of a primary seating material.

19. The vehicular electrostatic discharge control system according to claim 1, wherein:
the composition has
a tensile yield strength of at least 30 MPa as measured by ASTM D638;
a tensile elongation of at least 2% as measured by ASTM D638;
a flex modulus of at least 3400 MPa as measured by ASTM D790;
a notched Izod impact of at least 49 J/m as measured by ASTM D256; and
a specific gravity of at least 1.2.

20. A vehicular electrostatic discharge control system comprising:
a first dissipative element comprising a composition of polypropylene and a urethane/acrylic alloy, wherein the first dissipative element includes a first contact surface, the first contact surface being arranged and configured for substantially continuous contact with a vehicle occupant;
a second dissipative element comprising a composition of polypropylene and a urethane/acrylic alloy, wherein the second dissipative element includes a second contact surface, the second contact surface being arranged and configured for periodic contact by the vehicle occupant;
a vehicle chassis, wherein the first and second dissipative elements are connected to the vehicle chassis in a manner that defines first and second electrical connections, each connection being capable of dissipating a 10 kV charge within a discharge period of not less than 400 ms and not more than 1000 ms.

* * * * *